United States Patent [19]

Steele

[11] 4,425,564

[45] Jan. 10, 1984

[54] MULTIPLEX WIRING SYSTEM FOR MOTOR VEHICLES

[75] Inventor: Robert E. Steele, Cortland, Ohio

[73] Assignee: General Motors Corporation, Detroit, Mich.

[21] Appl. No.: 317,788

[22] Filed: Nov. 4, 1981

[51] Int. Cl.$^3$ .............................................. H04Q 9/00
[52] U.S. Cl. ..................... 340/825.79; 340/825.59; 340/825.42; 340/825.91
[58] Field of Search ............... 340/825.79, 825.59, 340/825.42, 825.43, 825.03, 825.04, 825.14, 825.98, 310 R, 310 A, 825.91

[56] References Cited

U.S. PATENT DOCUMENTS

| 3,560,940 | 2/1971 | Gaensslen | 340/825.79 |
| 3,587,076 | 6/1971 | Grover | 340/825.98 |
| 3,942,071 | 3/1976 | Krebs et al. | 340/825.79 |

*Primary Examiner*—Donald J. Yusko

*Attorney, Agent, or Firm*—Albert F. Duke

[57] ABSTRACT

A multiplex wiring system including a plurality of data line (n) from which ($n^2 - n$) load devices may be either independently or simultaneously energized. The system includes a synchronizing unit for applying an enabling voltage to each data line in sequence which applies a deactivating voltage to the remaining lines. A transmitter and a receiver gate of substantially the same electronic circuit configuration are provided for each load and are connected to two of the data lines to be simultaneously enabled. The transmitter gate is activated by closure of an associated switch and overrides the deactivating input to its associated receiver which is thereby activated to energize the associated load. Each load device has associated therewith means for maintaining the load in an energized state during the time interval when its associated transmitter and receiver gates are disabled by the synchronizing unit.

4 Claims, 9 Drawing Figures

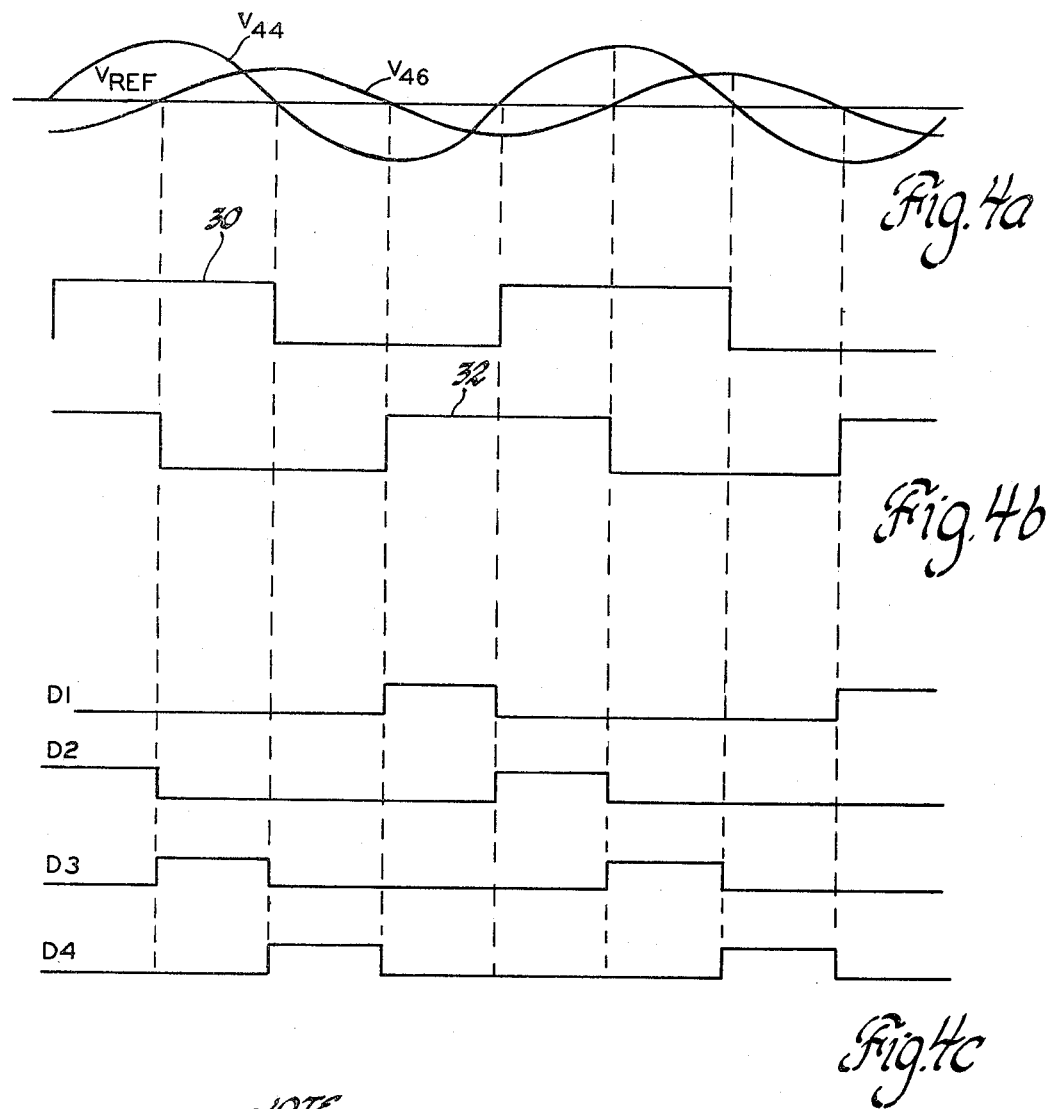
Fig. 4a
Fig. 4b
Fig. 4c
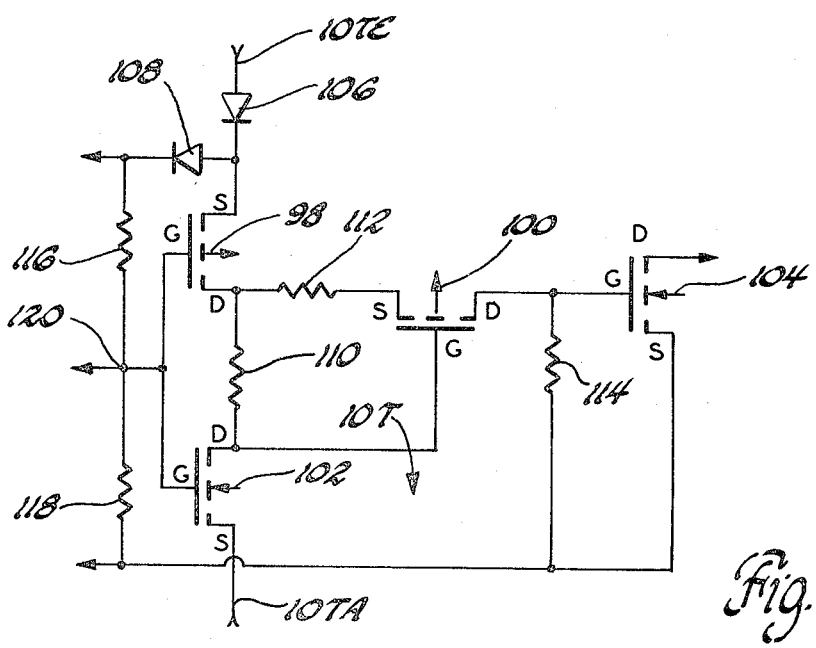
Fig. 5

MULTIPLEX WIRING SYSTEM FOR MOTOR VEHICLES

This invention relates to electrical wiring systems primarily, but not exclusively, for motor vehicles and, more particularly, to a multiplex system utilizing a parallel bus for both addressing and data transmission functions.

Prior art approaches to reducing the wiring in the automobile electrical system have tended to rely greatly on increased use of electronic circuitry and multiplexing. An example is the serial time devision multiplexing systems. In such systems the vehicle wiring is reduced to a minimum but the complex electronics required for coding and decoding and synchronizing data transmission have made most of these systems unacceptable. Approaches such as that shown in U.S. Pat. No. 3,891,965, assigned to the Assignee of the present invention, reduce the electronics but still require unique address decoders for each load and separate address and data buses. Other prior art approaches, such shown in U.S. Pat. No. 3,683,197 and 4,055,772 also require unique decoder logic.

With the foregoing in mind it is an object of the present invention to provide a multiplex system containing a plurality of parallel data lines (n) from which $(n^2-n)$ load devices may be either independently or simultaneously energized.

It is another object of the present invention to provide a parallel bus multiplex system utilizing simple electronics and which does not require unique decoder logic associated with each load.

These and other objects of the present invention may be had from the following detailed description which should be read in conjunction with the drawings in which:

FIGS. 4a-4c are timing waveforms generated in the synchronizing unit.

FIGS. 5 and 6 are detailed schematic diagrams of a transmitter and a receiver gate, respectively.

Figure 1:
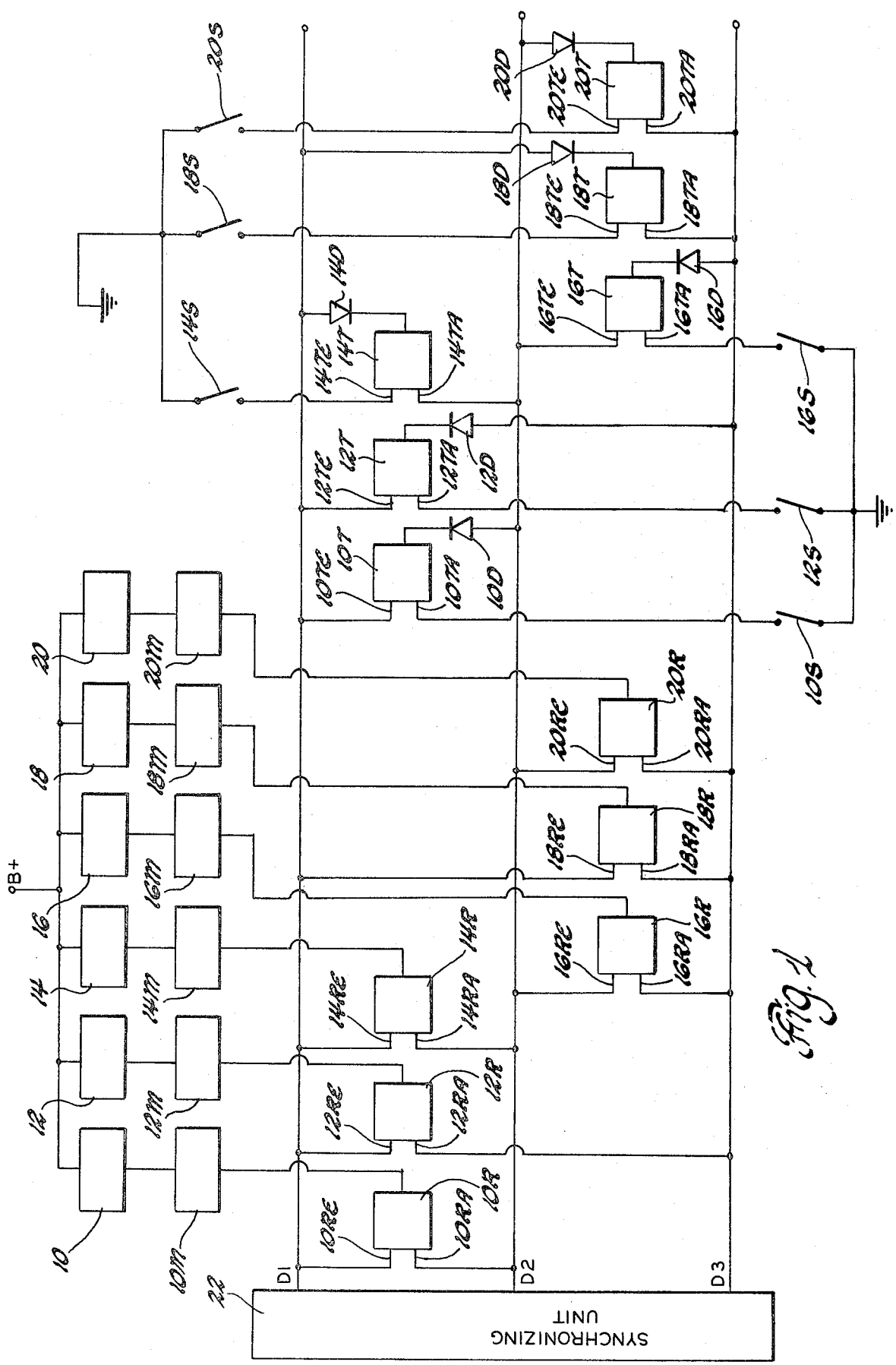
FIG. 1 is a block diagram of the system of the present invention.
Figure 2:
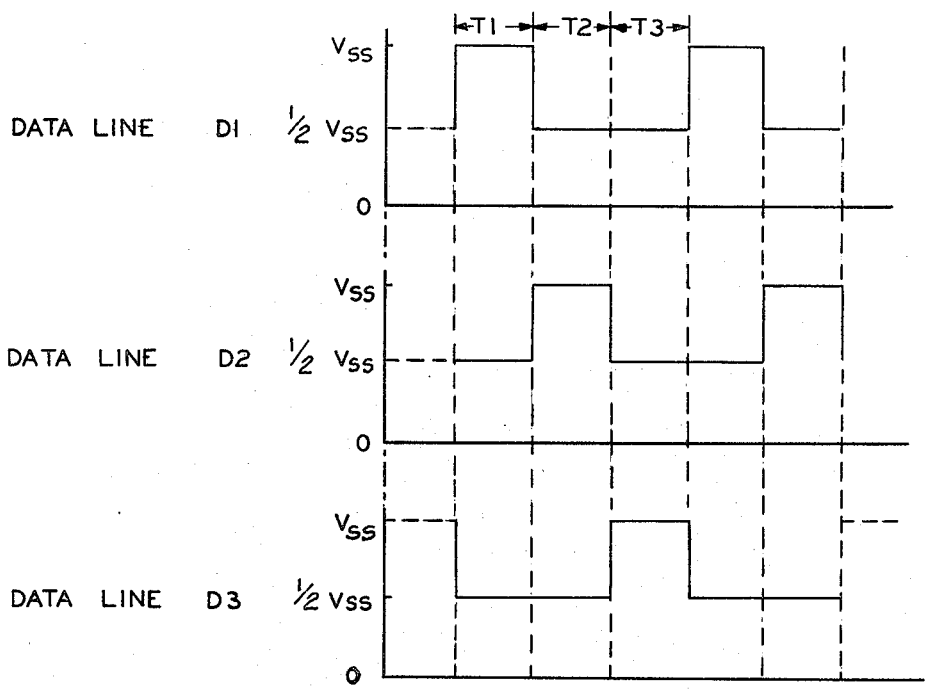
FIG. 2 is a timing diagram of the outputs of the synchronizing unit of the present invention.

Referring now to the drawings and initially to FIG. 1, the multiplex system of the present invention controls a plurality of load devices 10-20. Associated with each load device are load control means comprising receiver gates 10R-20R, transmitter gates 10T-20T, and manually actuable switches 10S-20S. Each of the receiver gates 10R-20R have an enabling input 10RE-20RE connected with one of a plurality of data lines D1, D2 and D3 and have an activating input 10RA-20RA connected with another one of the three data lines. Each of the gates 10R-20R and 10T-20T provide an activating output in response to concurrent application of an enabling input and an activating input. A synchronizing unit 22 applies an enabling voltage for a predetermined time interval to each of the data lines D1, D2 and D3 in sequence while applying a deactivating voltage to the remaining data lines. A timing diagram of the output voltage of the synchronizing unit 22 is shown in FIG. 2. By way of example, the time interval T1=T2=T3=0.1 milliseconds, and the voltage on the data lines switches between 2.5 volts and 5 volts.

The receiver gates 10R-20R, when activated, are adapted to connect their respective load devices 10-20 across a source of DC voltage represented by B+. In order to be activated, the receiver gates 10R-20R require that a high logic level voltage, say 5 volts, be applied to their respective enabling inputs 10RE-20RE and a low logic level voltage, say zero volts, be concurrently applied to their respective activating inputs 10RA-20RA. Since the voltage applied by the synchronizing unit 22 to the data lines D1-D3 switches between 2.5 volts and 5 volts, it will be understood that the receiver gates 10R-20R are sequentially enabled by the application of an enabling voltage by the synchronizing unit 22 to their respective enabling inputs but at the same time are deactivated by the synchronizing unit 22 by the application of 2.5 volts to their activating inputs.

The transmitter gates 10T-20T are two input gates similar to the receiver gates 10R-20R and have an enabling input 10TE-20TE and an activating input 10TA-20TA. In order to be activated the gates 10T-20T require a high logic level voltage be applied to the enabling input and a low logic level voltage be applied to the activating input. Each of the enabling inputs of the transmitter gates 10T-20T are connected to the same data line as its associated receiver gates 10R-20R. Thus, the associated receiver gate and transmitter gate are simultaneously enabled by the synchronizing unit 22. The activating input of the transmitter gates 10T-20T are connected through its respective switch 10S-20S to ground. Thus, closure of its associated switch during the time interval that an enabling voltage is applied to its enabling input will cause a transmitter gate to be activated. The output at each transmitter gate 10T-20T is connected through a diode 10D-20D to the same data line that the activating input of the associated receiver gate 10R-20R is connected. The output of each of the transmitter gates 10T-20T is connected with the activating input of its associated receiver gate 10R-20R through one of the data lines D1-D3. For example, the transmitter 10T output is connected to the activating input 10RA of the receiver gate 10R through the diode 10D and the data line D2. Application of 5 volts to the enabling input of the transmitter gates 10T-20T and concurrent application of 0 volts to the activating input thereof by closure of an associated switch 10S-20S drives the output of the transmitter gate to zero volts thereby applying zero volts to the activating input of the associated receiver through the interconnecting data line.

Energization of the load 10 is accomplished as follows. Assumming that the switch 10S is closed during the time that the data line D1 is enabled by the synchronizing unit 22, then the transmitter gate 10T output will be driven to zero volts which will override the deactivating voltage applied by the synchronizing unit 22 at the data line D2 to thereby apply zero volts to the activating input 10RA of the receiver gate 10R which causes the receiver 10R to be activated and connect the load 10 to ground potential.

Load devices 10-20 each have memory devices 10M-20M associated therewith for maintaining the load devices in an energized state for a predetermined interval of time following activation of the associated receiver gate. The time interval is at least as long as that existing between successive applications of an enabling voltage to the associated receiver gate. The devices 10M–20M may be monostable multivibrators. Alternatively, if the load device is a relay, the memory means may be incorporated in the relay by designing the relay to have a slower drop-out time than pull-in-time. Thus, if the load 20 is a relay so designed than its drop-out time is greater than 0.2 milliseconds, then as long as the switch 10S remains closed, the load 10 will remain in an energized state even though the energizing voltage is removed for the 0.2 millisecond interval between successive applications of the enabling voltage to the receiver gate 10R.

Operation of the system is as follows with reference to FIGS. 1 and 2. If the synchronizing unit 22 is in time period T1, 5 volts is applied to data line D1 and 2.5 volts is applied to data lines D2 and D3. Accordingly, the gates 10R,12R and 10T,12T are enabled. However, the gates 10R and 12R are deactivated by the 2.5 volts applied to the data lines D2 and D3. If during T1 switch 10S is closed, zero volts is applied to the activating input of the transmitter gate 10T activating this gate and pulling the data line D2 to zero volts which activates the gate and pulls the data line D2 to zero volts which activates the gate 10R thereby energizing the load 10. Similarly, if during T1 the switch 12S is closed, the load 12 is energized. The memory devices 10M and 12M will maintain the load devices 10 and/or 12 energized during the periods T2 and T3, when the gates 10R,12R and 10T, 12T are disabled by the 2.5 volts applied to the data line D1. During time period T2, 5 volts is applied to the data line D2 thereby enabling the gates 14R,16R and 14T,16T. During this period, closure of the switches 14S and/or 16S will cause energization of the loads 14 and/or 16. During time T3 the gates 18R,20R and 18T,20T are enabled so that closure of the switches 18S and/or 20S will cause energization of the loads 18 and 20. Thus with the FIG. 1 embodiment all six loads 10–20 may be independently or simultaneously energized from only three data wires. In general, the number of loads that may be independently or simultaneously energized is a function of the number of data lines (n) and may be expressed as $(n^2 - n)$.

Figure 3:
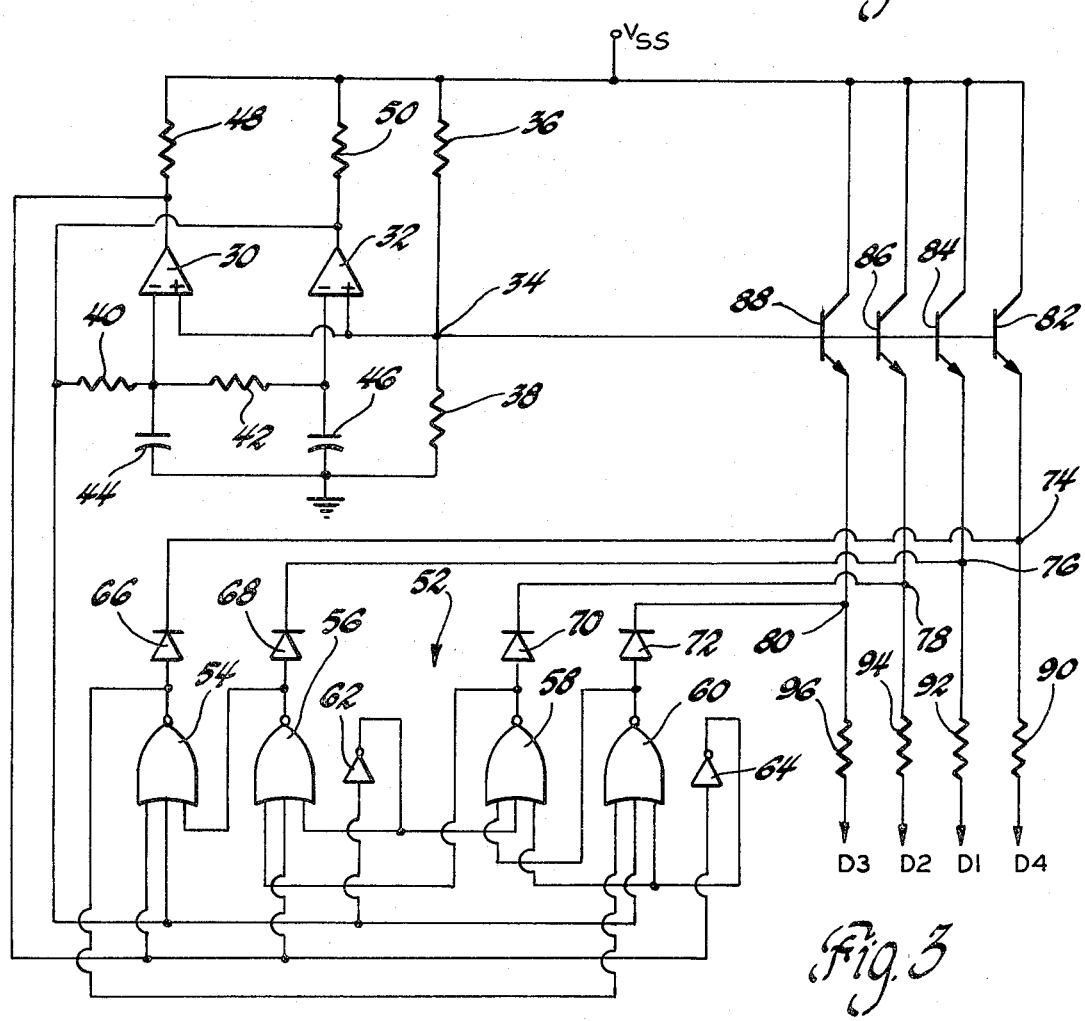
FIG. 3 is a detailed schematic diagram of a synchronizing unit.

Referring now to FIG. 3, there is shown a detail schematic diagram of a suitable synchronizing unit 22. In FIG. 3, the unit is designed to drive four data lines D1–D4 and, therefore, permits control of 12 loads either independently or simultaneously as opposed to the six shown in FIG. 1 where only three lines are driven. The unit comprises a pair of voltage comparators 30 and 32 having their noninverting inputs connected to a junction 34 where a reference voltage of $\frac{1}{2}$ V$_{ss}$ is established by equal value voltage dividing resistors 36 and 38. The inverting input of the comparators 30 and 32 are connected to a timing network comprising equal value resistors 40 and 42 and equal value capacitors 44 and 46. The output of the comparators 30 and 32 are connected to V$_{ss}$ through equal value pull-up resistors 48 and 50 and to logic generally designated 52. The logic 52 comprises NOR gates 54–60 and inverters 62 and 64. The outputs of the gates 54–60 are connected through diodes 66–72 to the junctions 74–80 between respective emitter follower transistors 82–88 and current limiting resistors 90–96. The base of transistors 82–88 are connected to the junction 34. The signals generated by the circuit of FIG. 3 are shown in FIGS. 4a–4c. In FIG. 4a, the voltage across the comparators 44 (V$_{44}$) and 46 (V$_{46}$) are shown. As shown in FIG. 4b, the outputs of comparators 30 and 32 switch when the signals V$_{44}$ and V$_{46}$, respectively, cross the voltage reference (V$_{REF}$) at the junction 34. The logic 52 controls the voltage level at the data lines D1–D4 as shown in FIG. 4c by combining the outputs of the comparators 30 and 32 and the level of one of the data lines. For example, control of data line D$_2$ is dependent on the status of comparators 30 and 32 and the data line D3. If all inputs to gate 58 are low, its output and therefore, D$_2$ is driven high (5 volts). This occurs when the outputs of both comparators 30 and 32 are high and D$_3$ is low. When the output of gate 58 is high, the outputs of gates 54, 56 and 50 are low which reverse biases the diodes 60, 68 and 72, respectively, so that transistors 82, 84 and 88, respectively, are on and place the data lines D$_1$, D$_2$ and D$_4$ at one-half V$_{ss}$ or about 2.5 volts.

Figure 6:
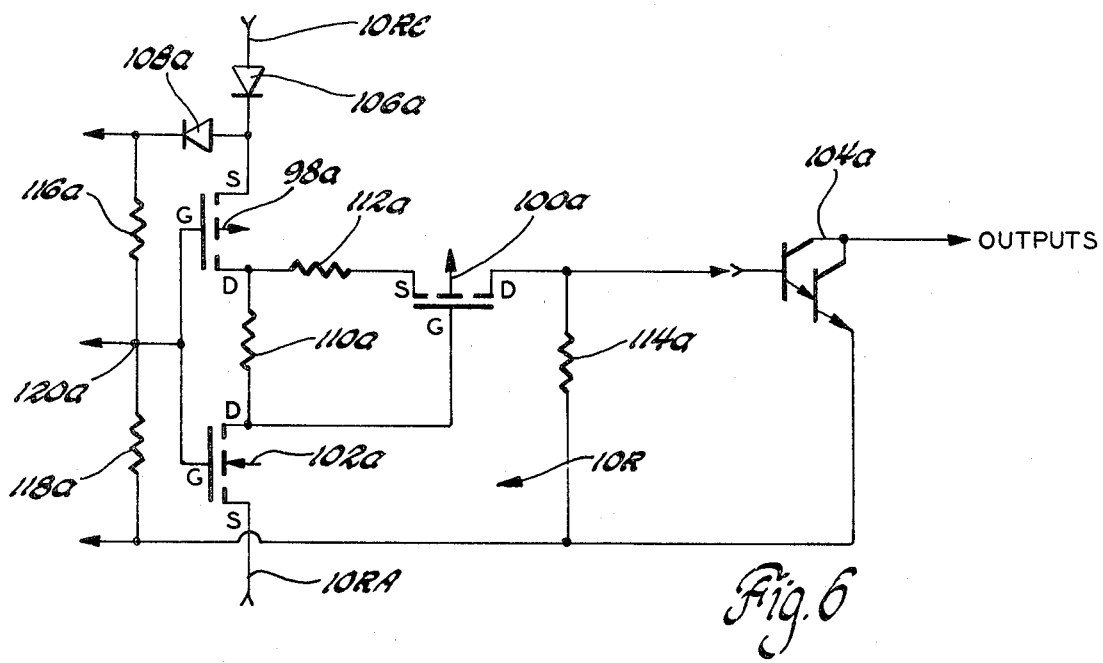

Referring now to FIG. 5, a detail schematic diagram of a transmitter gate such as the gate 10T is shown. The gate 10T includes P-channel field effect transistors 98 and 100 and N-channel field effect transistors 102 and 104. Each of the transistors 98–104 has source, gate and drain electrodes as indicated. The gate 10T further includes diodes 106 and 108 and resistors 110–114 all connected as shown. A voltage dividing network comprising resistors 116 and 118 is connected with each of the gates and establishes a voltage of approximately 2.5 volts at a junction 120 connected with the gates of transistors 98 and 102. Thus, whenever an enabling voltage is applied to the 10TE, the transistor 98 is switched to its low resistance state. If concurrently with application of an enabling voltage to the input 10TE, ground voltage is applied to the activate input 10TA by the switch 10F of FIG. 1, the transistor 102 is switched to its low resistance state. With the transistors 98 and 102 switched on, the transistor 100 is biased by the resistors 110 and 112 to its low resistance state. The voltage across 114 biases the transistor 104 to its low resistance state thereby placing the output of transistor 104 at ground potential. With reference to FIG. 6, it will be noted that the receiver gate 10R is identical to the transmitter gate 10T with the exception of the output device 104 which in the receiver gate is a high power device comprising a pair of NPN transistors. Components of the receiver gate 10R corresponding to those of the transmitter gate 10T are designated by the subscript (a). The operation of the receiver gate 10R is identical to that of the transmitter gate 10T as described above.

In the FIG. 1 embodiment, the drain of transistor 104 and the source of transistor 102a are connected with the data line D2 while the diodes 106 and 106a are connected with the data line D1. The collector-emitter path of the transistors 104a provides a ground path for a memory relay as previously described. When a transmitter gate of the configuration shown in FIG. 5 is utilized, the uni-directional conducting characteristic of the transistor 104 performs the function of the diodes 10D–20D of FIG. 1 rendering these diodes unnecessary.

Figure 7:
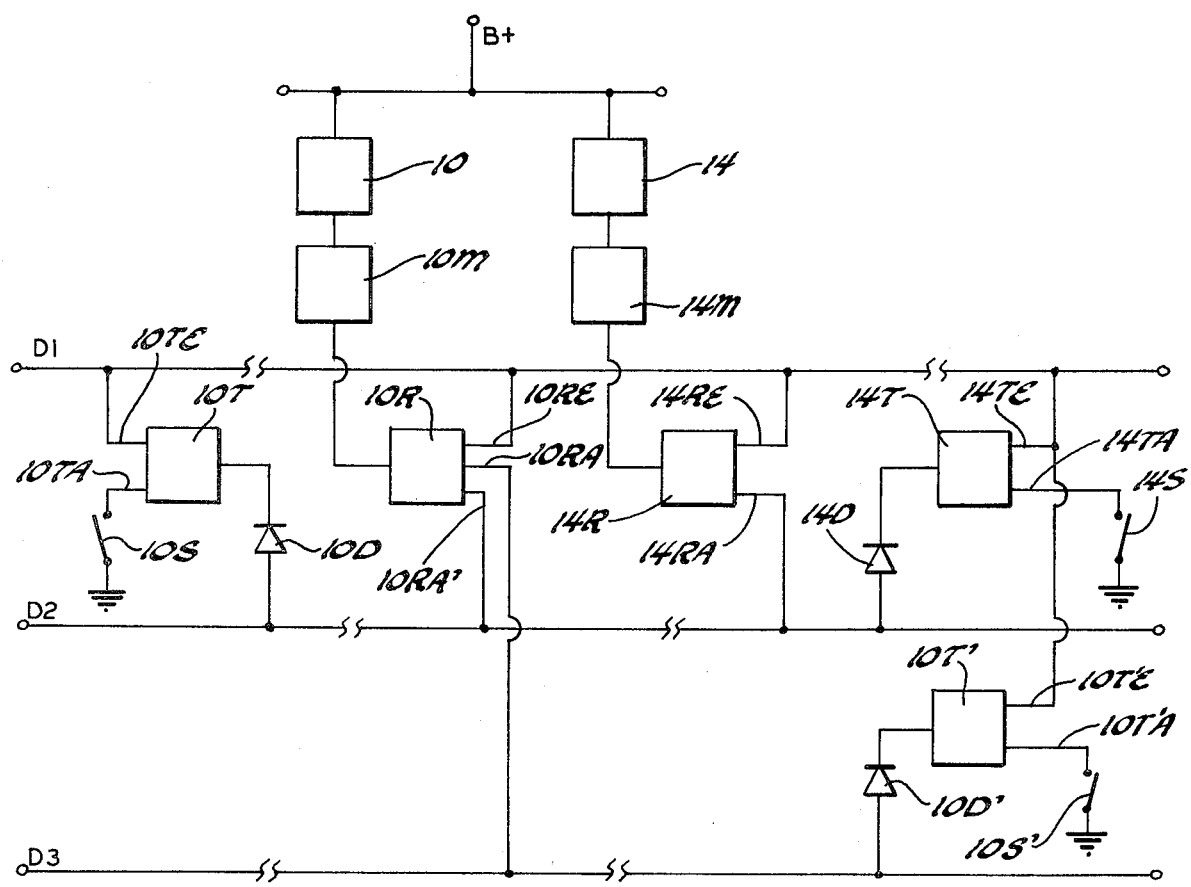
FIG. 7 shows another embodiment of the invention.

Referring now to FIG. 7, another embodiment of the invention is shown which indicates how a load may be activated as a function of multiple inputs. In FIG. 7, the load 10 is energized only when data line D1 is enabled and data lines D2 and D3 are activated. This condition exists only when the switch 10S or 14S is closed and the switch 10S' is closed. Load 14 is energized when data line D1 is enabled and switch 14S or switch 10S is closed. In FIG. 7, the gate 10R is a three input gate having two activating inputs 10RA and 10RA'. The gate 10R would be similar to that shown in FIG. 6 but would include a second set of components like 100a, 102a and 110a to accommodate a second activating input. Receiver and transmitter gates can be mixed on the same module or connected individually, allowing multidirectional communication without the normally associated complex data protocol and electronic circuitry.

The embodiments of the invention in which an exclusive property or privilege is claimed are defined as follows:

1. An electrical system for controlling ($n^2-1$) load devices said system comprising a plurality of data lines (n), synchronizing means for applying an enabling voltage for a predetermined time interval to each of said data lines in sequence while applying a deactivating voltage to the remaining data lines, load control means associated with each of said load devices and including receiver gate means, transmitter gate means, and a manually actuable switch means, said receiver gate means and transmitter gate means having first and second inputs, said receiver gate means and said transmitter gate means adapted to be activated in response to concurrent application of an enabling voltage to its first input and an activating voltage to its second input, the first input of said receiver gate means connected to a first data line, the second input of said receiver gate means connected with a second line whereby said receiver gate means is periodically enabled but simultaneously deactivated by said synchronizing means, the first input of said transmitter gate means connected to said first data line and the second input of said transmitter gate means connected with said switch means whereby said transmitter gate means is enabled by said synchronizing means simultaneously with said receiver gate means, said switch means adapted to apply an activating voltage to said second input of said transmitter means in response to operation thereof, said transmitter gate means responsive to operation of said switch means for overriding the deactivating voltage and applying an activating voltage to said second data line to activate the receiver gate means, means for energizing a load device in response to activation of said receiver gate means, memory means associated with each of said load devices for maintaining energization of its associated load device for an interval of time at least as long as that existing between successive applications of said enabling voltage to said receiver and transmitter gate means.

2. An electrical system for controlling a plurality of load devices, comprising a plurality of data lines, a two input receiver gate means and a two input transmitter gate means and a manually actuable switch means associated with respective ones of said load devices, each receiver gate means and associated transmitter gate means having one input connected to the same data line, the other input of each receiver gate means connected with a second one of said plurality of data lines, each transmitter gate means having its second input connected with its associated switch means, synchronizing means for applying a high logic level enabling voltage for a predetermined time interval to each of said data lines in sequence while applying a deactivating voltage to the remaining data lines, said transmitter gate means responsive to actuation of its associated switch means for overriding said deactivating voltage and applying a low logic level activating voltage to the data line connected with the second input of its associated receiver gate means to activate the receiver gate means, means for energizing a load device in response to activation of the associated receiver gate means, memory means associated with each of said load devices for maintaining energization of its associated load device for an interval of time at least as long as that existing between successive applications of said enabling voltage to its associated receiver gate means.

3. A multiplex wiring system for controlling ($n^2-n$) load devices comprising a plurality of data lines (n), each load device having associated therewith a receiver gate, a transmitter gate and a manually actuable switch, each gate having an enabling input, an activating input and an output, means connecting the enabling input of each associated receiver gate and transmitter gate to one of said data lines, means connecting each associated transmitter gate output and receiver gate activating input to a second data line, means connecting the activating input of each transmitter gate to its associated switch, synchronizing means for applying an enabling voltage to each of said data lines in sequence while applying a deactivating voltage to the remaining data lines, each transmitter gate responsive to actuation of its associated switch for overriding said deactivating voltage and applying an activating voltage to the data line connected with the activating input of the associated receiver gate, each receiver gate providing an energizing path for an associated load device in response to application of said enabling voltage from said synchronizing unit and concurrent application of said activating voltage from its associated transmitter gate, each load device having associated therewith a memory device for maintaining energization of the load device for an interval of time at least as long as that existing between successive applications of said enabling voltage to its associated receiver gate means.

4. A multiplex wiring system including a plurality of load devices, each load device having associated therewith a receiver gate, a transmitter gate and a manually actuable switch; each gate having an enabling input, an activating input, and an output; a plurality of data lines, means connecting the enabling input of each associated receiver gate and transmitter gate to one of said data lines, means connecting each associated transmitter gate output and receiver gate activating input to a second data line, means connecting the activating input of each transmitter gate to its associated switch, synchronizing means for applying an enabling voltage to each of said data lines in sequence while applying a deactivating voltage to the remaining data lines, each transmitter gate responsive to actuation of its associated switch for overriding said deactivating voltage and applying an activating voltage to the data line connected with the activating input of the associated receiver gate, each receiver gate responsive to concurrent application of said enabling voltage from said synchronizing unit and said activating voltage from its associated transmitter gate for establishing an energizing path for its associated load device, means for maintaining said energizing path for an interval of time at least as long as that existing between successive applications of said enabling voltage to a receiver gate means.

* * * * *